United States Patent
Khalid et al.

(10) Patent No.: US 9,798,730 B2
(45) Date of Patent: *Oct. 24, 2017

(54) SYSTEMS AND METHODS FOR FOLDER REDIRECTION

(71) Applicant: Citrix Systems, Inc., Fort Lauderdale, FL (US)

(72) Inventors: A T M Shafiqul Khalid, Redmond, WA (US); Abolfazl Sirjani, Kirkland, WA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 204 days.

This patent is subject to a terminal disclaimer.

(21) Appl. No.: 14/298,401

(22) Filed: Jun. 6, 2014

(65) Prior Publication Data

US 2014/0289291 A1    Sep. 25, 2014

Related U.S. Application Data

(63) Continuation of application No. 12/254,110, filed on Oct. 20, 2008, now Pat. No. 8,782,021.

(60) Provisional application No. 60/981,485, filed on Oct. 20, 2007.

(51) Int. Cl.
*G06F 7/00* (2006.01)
*G06F 17/30* (2006.01)

(52) U.S. Cl.
CPC .. *G06F 17/30115* (2013.01); *G06F 17/30126* (2013.01)

(58) Field of Classification Search
CPC ......... G06F 17/30067; G06F 17/30327; G06F 17/30283; G06F 17/30115; G06F 17/30126
USPC .......... 707/636, 694, 999.001, 782
See application file for complete search history.

(56) References Cited

U.S. PATENT DOCUMENTS

| | | | | |
|---|---|---|---|---|
| 5,410,688 A | * | 4/1995 | Williams | G06F 9/465 |
| 5,611,048 A | * | 3/1997 | Jacobs | G06F 21/31 |
| | | | | 711/164 |
| 5,778,384 A | * | 7/1998 | Provino | G06F 17/30233 |
| 5,785,638 A | * | 7/1998 | Bristo | B65H 45/142 |
| | | | | 493/420 |
| 6,018,805 A | | 1/2000 | Ma et al. | |

(Continued)

FOREIGN PATENT DOCUMENTS

EP    0 780 778 A2    6/1997

OTHER PUBLICATIONS

European Examination Report on 08839327.7 dated Apr. 9, 2013.
(Continued)

*Primary Examiner* — Daniel Kuddus
(74) *Attorney, Agent, or Firm* — Foley & Lardner LLP; John D. Lanza; James De Vellis (57) ABSTRACT

A method for redirecting, to a second machine, without user intervention, a request for access to a folder on a first machine, the request made by a resource executing within a remote access session on the first machine, includes receiving, by a component on a first machine, folder mapping information associated with a folder provided by a shell namespace on a second machine. The component intercepts a request by a resource executing on the first machine for access to file system data on the first machine. The component redirects the request to the second machine responsive to the received folder mapping information.

20 Claims, 7 Drawing Sheets

(56) References Cited

U.S. PATENT DOCUMENTS

| | | | |
|---|---|---|---|
| 6,076,105 A * | 6/2000 | Wolff | G06F 9/52 |
| | | | 707/999.01 |
| 6,106,603 A * | 8/2000 | Skaggs | C04B 40/0035 |
| | | | 106/172.1 |
| 6,109,603 A | 8/2000 | Stevens et al. | |
| 6,161,139 A * | 12/2000 | Win | G06F 21/604 |
| | | | 709/223 |
| 6,208,991 B1 * | 3/2001 | French | G06F 17/30067 |
| 6,327,594 B1 | 12/2001 | Van Huben et al. | |
| 6,442,696 B1 * | 8/2002 | Wray | G06F 21/31 |
| | | | 713/176 |
| 6,718,372 B1 * | 4/2004 | Bober | G06F 17/30203 |
| | | | 707/E17.032 |
| 7,100,195 B1 * | 8/2006 | Underwood | G06F 9/4443 |
| | | | 707/999.009 |
| 7,149,959 B1 | 12/2006 | Jones et al. | |
| 7,191,290 B1 | 3/2007 | Ackaouy et al. | |
| 7,765,537 B2 * | 7/2010 | Havin | G06F 9/445 |
| | | | 717/130 |
| 7,814,554 B1 | 10/2010 | Ragner | |
| 8,516,038 B2 * | 8/2013 | Jalon | G06F 17/30126 |
| | | | 709/200 |
| 8,620,886 B1 * | 12/2013 | Madan | G06F 17/00 |
| | | | 707/697 |
| 2005/0010964 A1 | 1/2005 | Sano et al. | |
| 2005/0076095 A1 | 4/2005 | Mathew et al. | |
| 2006/0069662 A1 * | 3/2006 | Laborczfalvi | G06F 17/30067 |
| 2006/0143703 A1 * | 6/2006 | Hopen | G06F 21/6218 |
| | | | 726/15 |
| 2007/0067255 A1 | 3/2007 | Bissett et al. | |
| 2007/0083501 A1 * | 4/2007 | Pedersen | G06F 17/30067 |
| 2007/0169000 A1 | 7/2007 | Havin et al. | |
| 2007/0180447 A1 * | 8/2007 | Mazzaferri | G06F 3/1415 |
| | | | 718/1 |
| 2009/0187654 A1 | 7/2009 | Raja et al. | |
| 2012/0084713 A1 * | 4/2012 | Desai | G06F 3/0481 |
| | | | 715/788 |
| 2012/0297181 A1 * | 11/2012 | Lee | G06F 8/68 |
| | | | 713/2 |
| 2012/0324365 A1 | 12/2012 | Momchilov et al. | |
| 2013/0212067 A1 * | 8/2013 | Piasecki | G06F 17/30176 |
| | | | 707/620 |

OTHER PUBLICATIONS

International Search Report from PCT/US2008/080422, dated Apr. 8, 2009.
Microsoft Corporation: "Folder Redirection feature in Windows," Support.Microsoft.com, Mar. 22, 2007, pp. 1-2. Available at http://support.microsoft.com/kb/232692.
Microsoft Corporation: "Folder Redirection Overview," Technet Microsoft.com, Mar. 1, 2002, pp. 1-3. Available at http://technet.microsoft.com/en-us/library/cc778976.aspx.
Microsoft Corporation: "Windows Server 2003 Group Policy Infracture," Mar. 2006. pp. 1-138. Available at http://www.microsoft.com/downloads/details.aspx?familyid=237B03AF-FA8C-4362-8B03-90C47B9B8BE2&displaylang=en.
Notice of Allowance on U.S. Appl. No. 12/254,110 dated Mar. 13, 2014.
Office Action on U.S. Appl. No. 12/254,110 dated Dec. 20, 2011.
Office Action on U.S. Appl. No. 12/254,110 dated Feb. 10, 2011.
Office Action on U.S. Appl. No. 12/254,110 dated May 18, 2012.
Office Action on U.S. Appl. No. 12/254,110 dated Aug. 25, 2011.
Office Action on U.S. Appl. No. 12/254,110 dated Sep. 26, 2013.
Written Opinion of the International Searching Authority from PCT/US2008/080422, dated Apr. 8, 2009.

* cited by examiner

SYSTEMS AND METHODS FOR FOLDER REDIRECTION

RELATED APPLICATIONS

The present application is continuation of U.S. patent application Ser. No. 12/254,110, titled "Systems and Methods for Folder Redirection" filed on Oct. 20, 2008, which claims priority to U.S. Provisional Patent Application Ser. No. 60/981,485, titled "Systems and Methods for Folder Redirection," filed Oct. 20, 2007, which are both incorporated herein by reference in their entirety.

FIELD OF THE INVENTION

This disclosure generally relates to remote access to computing resources. In particular, this disclosure relates to systems and methods for redirecting access to one or more folders in a remote access session.

BACKGROUND

In typical systems for providing clients with remote access to network resources, issues may arise relating to which versions of resources are provided to the clients. One such problem arises in situations where a remote machine provides access to folders, files, or other data which have names or identifiers that are substantially similar to those of folders, files or other data provided by a local machine. For example, both machines may provide access to special folders maintained by an operating system (e.g., "My Documents" in a WINDOWS operating system environment). Typically, the remote application displays remotely-located folders to a user of a client machine by default. In some circumstances, therefore, the user receives access to a remote folder but may believe that the application is displaying the user's local folder, which may cause the user confusion. For example, the user may intend to save a document to the local machine, yet may inadvertently save the document on a remote machine.

SUMMARY

In one aspect, a method for redirecting, to a second machine, without user intervention, a request for access to a folder on a first machine, the request made by a resource executing within a remote access session on the first machine, includes receiving, by a component on a first machine, folder mapping information associated with a folder provided by a shell namespace on a second machine. The method includes intercepting, by the component, a request by a resource executing on the first machine for access to file system data on the first machine. The method includes redirecting, by the component, the request to the second machine responsive to the received folder mapping information.

In another embodiment, the method includes identifying, in the intercepted request, an address associated with a folder located on the first machine. In another embodiment, the method includes remapping the identified address to an address of the folder provided by the shell namespace on the second machine. In still another embodiment, the method includes transmitting, to the second machine, the intercepted request and the remapped address.

In another aspect, a system for redirecting, to a second machine, without user intervention, a request for access to a folder on a first machine, the request made by a resource executing within a remote access session on the first machine, includes a first component and a second component. In one embodiment, the first component on the first machine i) receives folder mapping information associated with a folder provided by a shell namespace on a second machine, ii) intercepts a request by a resource executing on the first machine to access file system data on the first machine, and iii) redirects the request to the second machine, responsive to the received folder mapping information. The second component on the second machine receives the redirected request and modifies file system information on the second machine responsive to the received request.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1A:
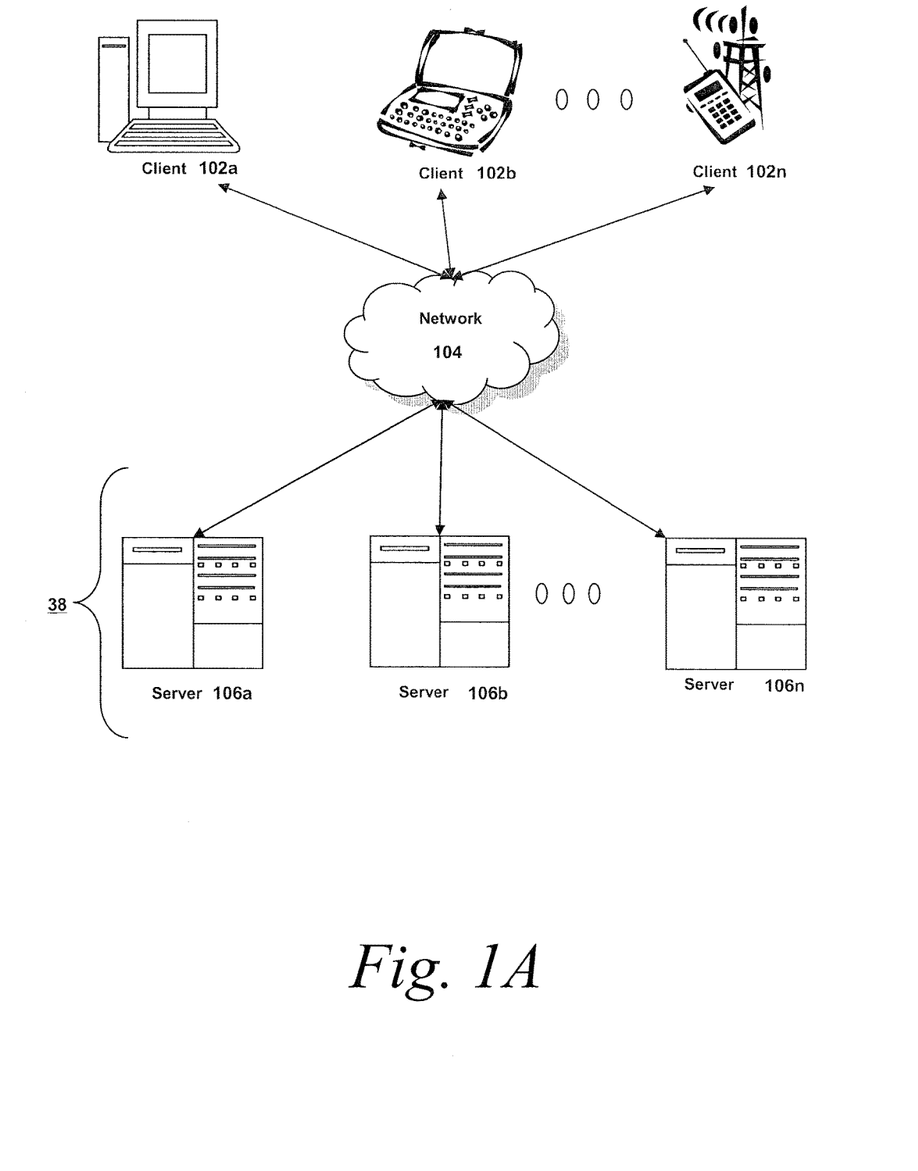
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client computer(s) 102, or endpoint(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a client 102. In other embodiments, a server 106 executes a virtual machine, which provides an execution session within which applications execute on behalf of a user or a client 102. In one of these embodiments, the execution session is a hosted desktop session. In another of these embodiments, the server 106 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

The servers 106 of each farm 38 may not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

A server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates with one of the servers 106 in a farm 38. Over the network 104, the client 102 can, for example, request execution of various applications hosted by the servers 106a-106n in the farm 38 and receive output data of the results of the application execution for display. In one embodiment, the client 102 executes a program neighborhood application to communicate with a server 106 in a farm 38.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment, the server 106 may display output data to the client 102 using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
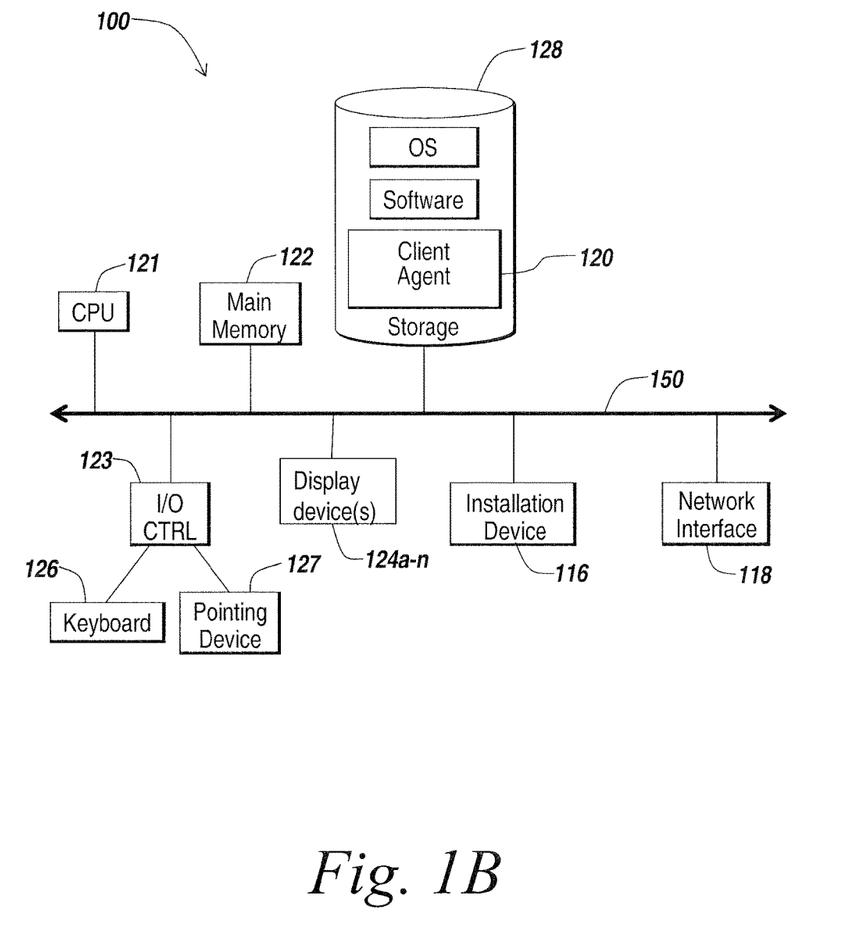
FIGS. 1B and 1C are block diagrams depicting embodiments of computers useful in connection with the methods and systems described herein.
Figure 1C:
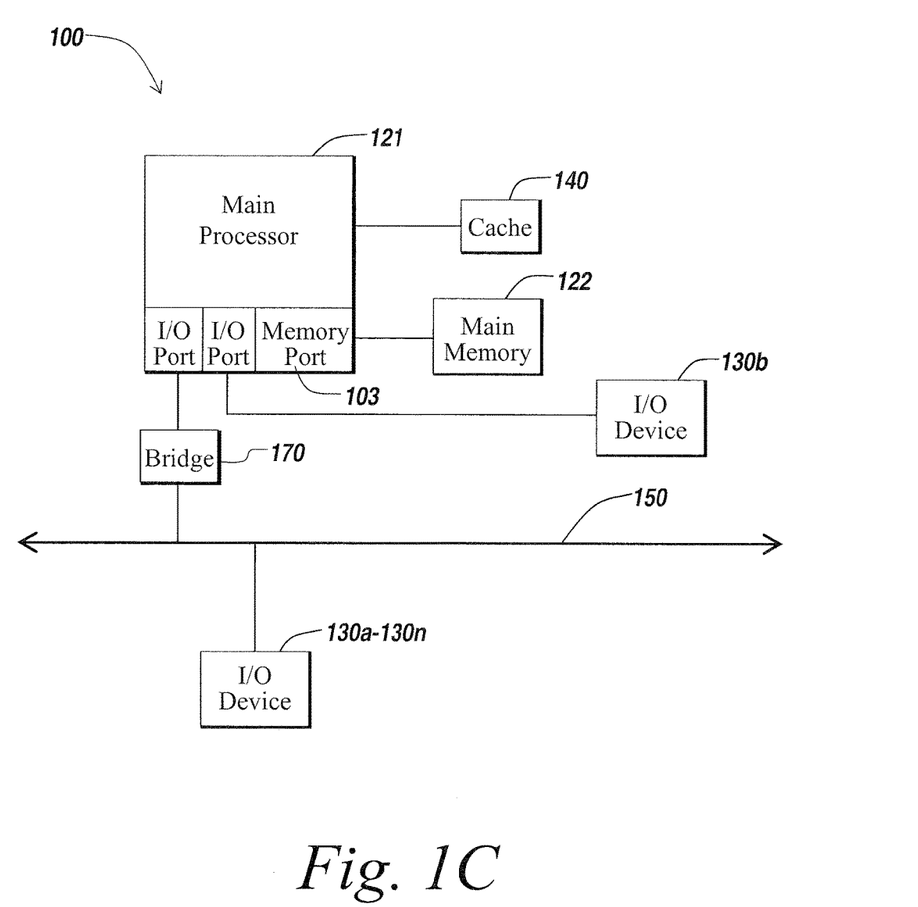

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, Flash memory, or EEPROMs, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PALM operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry PEARL 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In one embodiment, the server 106 includes a policy engine for controlling and managing the access to a resource, selection of an execution method for accessing the resource, and the delivery of resources. In another embodiment, the server 106 communicates with a policy engine. In some embodiments, the policy engine determines the one or more resources a user or client 102 may access. In other embodiments, the policy engine determines how the resource should be delivered to the user or client 102, e.g., the method of execution. In still other embodiments, the server 106 provides a plurality of delivery techniques from which to select a method of execution, such as a server-based computing, application streaming, or delivering the application locally to the client 102 for local execution. In other embodiments, the policy engine 195 can apply a policy configured by an administrator or the end-user to redirect read and/or write access to one or more file systems folders. For example, the policy engine can apply a policy that results in redirection of requests for access to the "My Documents" folder associated with a server machine 106 to the "My Documents" folder of the client machine 102.

Figure 2:
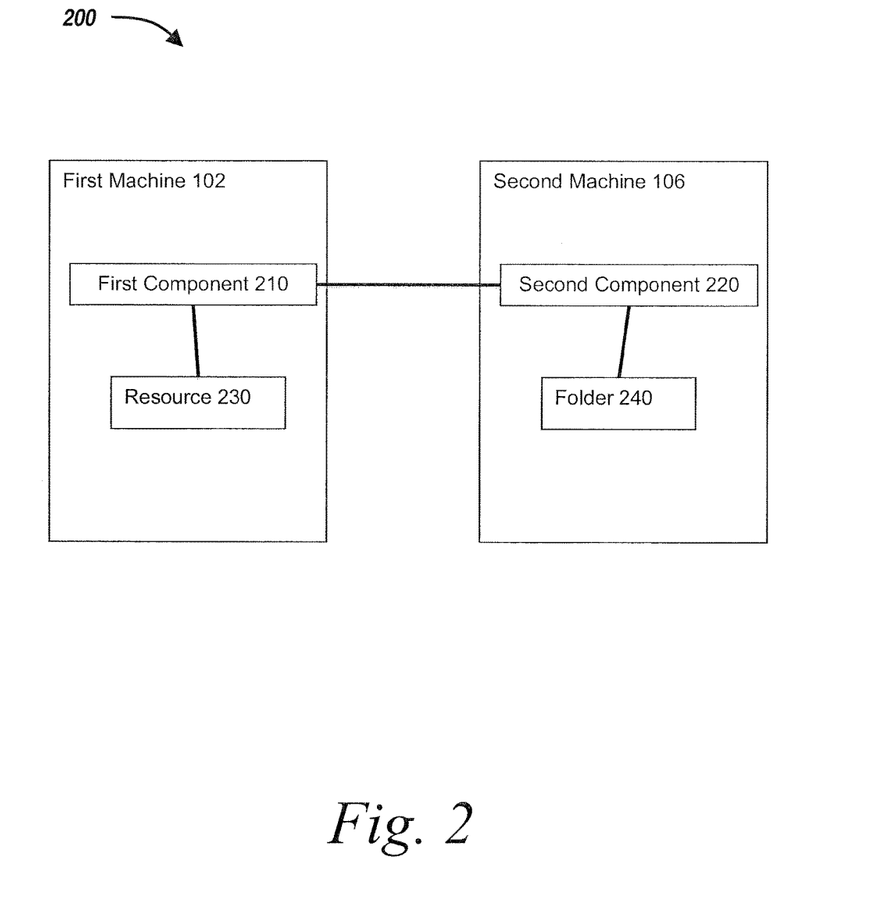
FIG. 2 is a block diagram depicting an embodiment of a system for redirecting, to a second machine, without user intervention, a request for access to a folder on a first machine, the request being made by a resource executing within a remote access session on the first machine.

Referring now to FIG. 2, a block diagram depicts an embodiment of a system 200 for redirecting, to a second machine 106, a request for access to a folder on a first machine 102, the request being made by a resource executing within a remote access session on the first machine 102. In brief overview, the system 200 includes a first machine 102, a first component 210, a resource 230 executing on the first machine 102, a second machine 106, and a second component 220. The first component 210 on the first machine 102 i) receives folder mapping information associated with a folder 240 provided by a shell namespace on the second machine 106, ii) intercepts a request by a resource 230 executing on the first machine 102 to access file system data on the first machine 102, and iii) redirects the request to the second machine 106, responsive to the received folder mapping information. The second component 220 on the second machine 106 receives the redirected request and modifies file system information on the second machine 106 responsive to the received request.

Referring now to FIG. 2, and in greater detail, a shell is software providing a user interface to the user. In one embodiment, a shell may be supplemented or replaced with a third-party shell. In MICROSOFT WINDOWS, the default shell is EXPLORER, which determines the configuration of the desktop (e.g., the task bar, notification area, start menu, etc.). In one embodiment, a shell namespace maintained by the shell provides a graphical display of a tree-structured hierarchy of files and folders in a file system managed by a shell on a computer. In another embodiment, folders objects are nodes of the tree. In another embodiment, folder objects are containers for file objects, other folders in the file system, or links to files stored on other file systems. In still another embodiment, file objects are leaves of the tree. In yet another embodiment, file objects may include normal disk files or virtual objects, such as printer links. In still yet another embodiment, folders that are not part of the file system may be referred to as virtual folders. In another embodiment, objects within the shell namespace may be identified by a unique pathname. In yet another embodiment, a virtual folder may organize files independently of their physical location. Unlike a regular folder, files in a virtual folder are not limited to any to any single physical location on one machine, but may include links to files in any location on a plurality of networked machines and/or databases. In this way, a virtual folder may be a collection of shortcuts to actual files and folders, according to embodiments of the invention.

Some special folders provide access to user folders while the user accesses a resource that accesses user-specific data. For example, a user can launch a word processing application and interact with the user interface to request access to data; for example, a user may click on a "File→Open" option that launches an Open dialog box. The dialog box typically provides a list of files and folders the user typically interacts with on a regular basis. In some embodiments, the dialog box displays a special folder; examples of such special folders provided in a MICROSOFT WINDOWS environment can include a "My Documents" folder or "My Desktop" folder. Special folders may provide access to both regular and virtual folders located either on a local machine or on one or more remote machines.

In some embodiments, the first component 210 includes a file system redirector that receives the intercepted request and transmits the intercepted request to the second component 220. In one embodiment, the file system redirector is a file system filter driver. In another embodiment, the file system redirector is a mini filter driver. In yet another embodiment, the file system redirector is a hooking mechanism. In each of these embodiments, the file system redirector may have been modified to integrate the functionality described herein.

In other embodiments, the first component 210 includes a receiver receiving folder mapping information associated with a special folder or a virtual folder provided by the shell namespace on the second machine 106. In some embodiments, the folder mapping information may include, without limitation, the pathname, the item ID, the actual address, and/or the type (e.g., special or virtual) of the folder 240 provided by the shell namespace on the second machine 106.

In one embodiment, the first component 210 is part of a presentation layer protocol agent. In another embodiment, the first component 210 is in communication with a presentation layer protocol agent.

In one embodiment, the resource 230 includes, without limitation, a program, an application, a document, a file, a plurality of applications, a plurality of files, an executable program file, a desktop environment, a computing environment, or other resource made available to a user of the second machine 106.

In one embodiment, the second component 220 on the second machine 106 identifies folder mapping information associated with the folder 240 provided by the shell namespace on the second machine 106. In another embodiment, the second component 220 may be in communication with another agent on the second machine, wherein the agent is identifying the folder mapping information associated with the folder 240. In still another embodiment, the second component 220 transmits the identified folder mapping information to the first machine 102. In some embodiments, the second component 220 receives, from the first machine 102, a request for modification of the folder 240 associated with the folder mapping information. For example, the second component 220 may receive a request to read or write to a file stored in a directory represented by the folder mapping information.

In one embodiment, the second component 220 is provided as a component of a presentation layer protocol agent. In another embodiment, the second component 220 is in communication with a presentation layer protocol agent.

Figure 3:
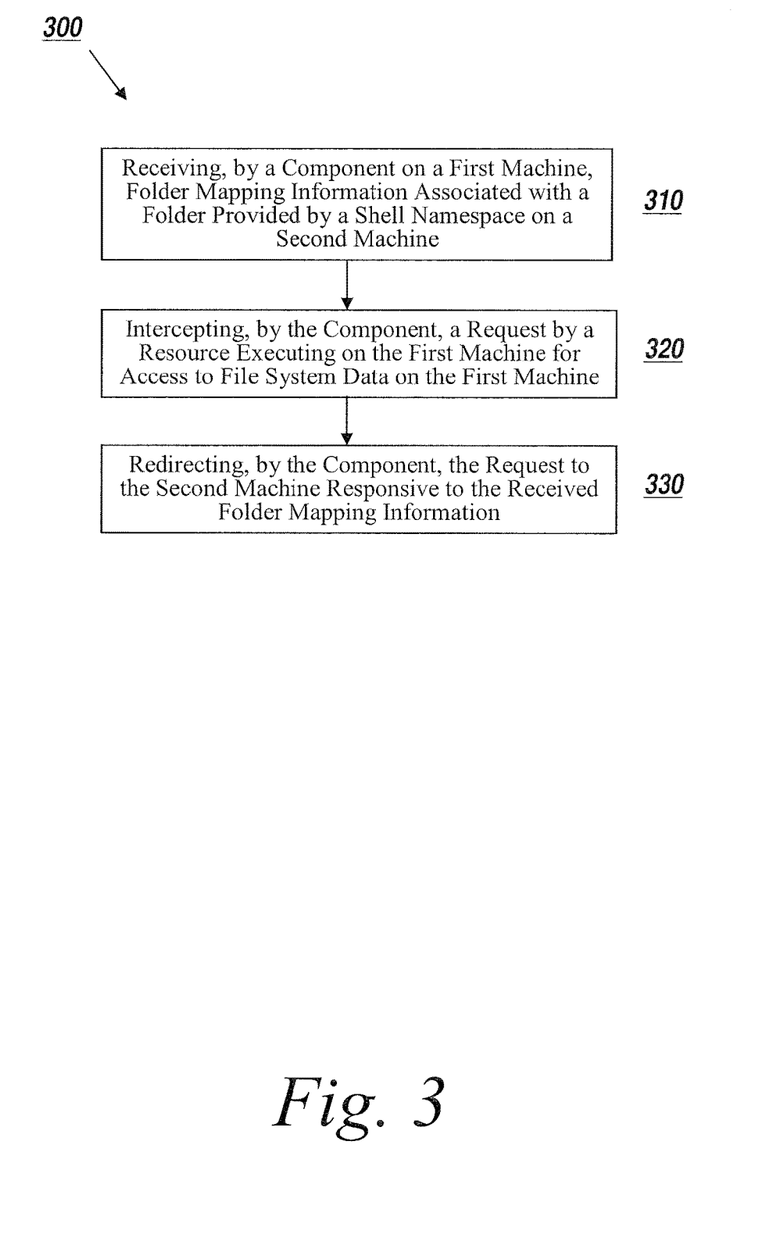
FIG. 3 is a flow diagram depicting an embodiment of a method for redirecting, to a second machine, without user intervention, a request for access to a folder on a first machine, the request being made by a resource executing within a remote access session on the first machine.

Referring now to FIG. 3, a flow diagram depicts an embodiment of a method 300 for redirecting, to a second machine 106, without user intervention, a request for access to a folder on a first machine 102, the request made by a resource 230 executing within a remote access session on a first machine 102. In brief overview, the method 300 includes receiving, by a component 210 on a first machine 102, folder mapping information associated with a folder 240 provided by a shell namespace on a second machine 106 (block 310). The component 210 intercepts a request by a resource 230 executing on the first machine 102 for access to file system data on the first machine 102 (block 320). The component 210 redirects the request to the second machine 106 responsive to the received folder mapping information (block 330).

A component 210 on a first machine 102 receives folder mapping information associated with a folder 240 provided by a shell namespace on a second machine 106 (block 310). In one embodiment, the component 210 on the first machine 102 receives an address of the folder provided by the shell namespace on the second machine 106. In another embodiment, the component 210 on the first machine 102 receives an instruction to redirect, to the second machine 106, a request for access to file system data on the first machine 102, responsive to the received folder mapping information associated with the folder 240 provided by the shell namespace on the second machine 106. In other embodiments, component 210 maps, to the first machine 102, a folder on the second machine 106 for access by a resource executing on the second machine 106.

In one embodiment, an agent 220 on the second machine 106 identifies folder mapping information associated with the folder 240 provided by the shell namespace on the second machine 106. In another embodiment, the agent 220 transmits the identified folder mapping information to the first machine 102. In some of these embodiments, the agent 220 receives, from the first machine 102, a request for modification of the folder 240 associated with the folder mapping information. In some of these embodiments, the agent 220 modifies file system information on the second machine 106 responsive to the received request.

The component 210 intercepts a request by a resource 230 executing on the first machine 102 for access to file system data on the first machine 102 (block 320). In some embodiments, the component 210 intercepts a request by the resource 230 executing on the first machine 102 to modify file system information associated with the first machine 102. In other embodiments, the component 210 intercepts a request by the resource 230 executing on the first machine 102 to read a file in a folder provided by a shell namespace on the first machine 102. In other embodiments, the component 210 intercepts a request by the resource 230 executing on the first machine 102 to modify a file in a folder provided by a shell namespace on the first machine 102. In one embodiment, the component 210 intercepts a request by the resource 230 executing on the first machine 102 to read a file in a special folder provided by a shell namespace on the first machine 102. In another embodiment, the component 210 intercepts a request by the resource 230 executing on the first machine 102 to modify a file in a special folder provided by a shell namespace on the first machine 102.

The component 210 redirects the request to the second machine 106 responsive to the received folder mapping information (block 330). In some embodiments, the component 210 transmits the intercepted request to a file system redirector. In one of these embodiments, the file system redirector transmits the intercepted request to the second machine 106.

In one embodiments, a second component 220 on the second machine 106 receives the redirected request. In another embodiment, the second component 220 identifies the request as a request to enumerate at least one file or object in a directory represented by a special folder. In yet another embodiment, the second component 220 transmits, to the first machine 102, an enumeration of the requested at least one file or object for display by the resource 230 executing on the first machine. In some embodiments, the second component 220 identifies the request as a request to enumerate at least one file or object in a directory represented by a special folder. In one embodiment, the second component 220 enumerates at least one file or object in a directory by a special folder in response to a received request. In other embodiments, the second component 220 identifies the request as a request to open a file contained in a special folder. In one embodiment, the second component 220 opens a file contained in a special folder, displaying any output data on the first machine 102. In still other embodiments, the second component 220 identifies the request as a request to modify (e.g., delete or write to) a file, an object, or data on the file system. In one embodiment, the second component 220 modifies (e.g., deletes or writes to) a file, an object, or data on the file system.

In one embodiment, the component 210 determines that the request by the resource 230 executing on the first machine 102 is a request for access to a folder provided by a shell namespace on the first machine 102. In one embodiment, the component 210 identifies, in the intercepted request, an address associated with a folder located on the first machine 102. In another embodiment, the component 210 identifies the address as one for which the component 210 has received folder mapping information from the second machine. In another embodiment, the identified address is remapped to an address of the folder provided by the shell namespace on the second machine 106 at substantially the same time as the request interception. In still another embodiment, at least one of the intercepted request and the remapped address are then transmitted to the second machine 106.

In other embodiments, the first machine 102 provides, to the resource 230, access to file system data associated with the second machine 106. In one of these embodiments, the first machine 102 provides, to the resource 230, access to a special folder located on the second machine 106. In another embodiment, the first machine 102 provides, to the resource 230, access to a virtual folder located on the second machine 106.

In one embodiment, the second machine 106 responds by modifying a file on the second machine 106. In another embodiment, the second machine 106 responds by transmitting a file to the first machine 102.

Figure 4A:
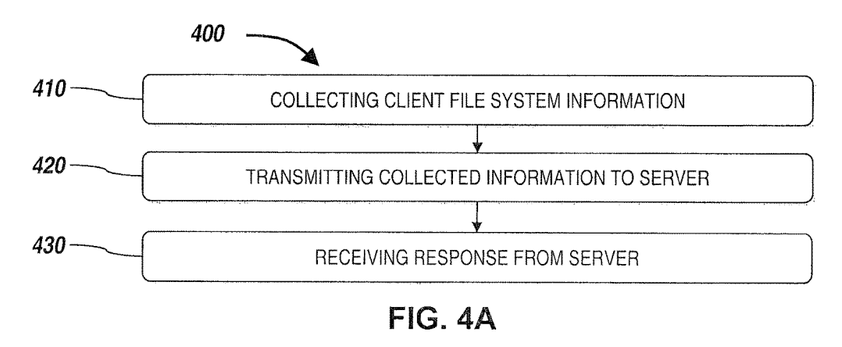
FIG. 4A is a flow diagram depicting an embodiment of a method for functions performed by a client.

Referring now to FIG. 4A, a flow diagram depicts an embodiment of a method 400 of actions performed by a client 102. The method includes collecting client file system information (block 410), transmitting that collected information to the server 106 (block 420), and receiving a response from the server (block 430).

In one embodiment, a component 210 collects file system information about the client 102 (block 410). In another embodiment, component 210 collects special folder information (e.g. "My Documents" folder information) from the client 102. In another embodiment, a client agent 120 collects file system information about the client 102. In still another embodiment, a redirector module collects file system information about the client 102. In some embodiments, component 210 collects file system information including folder mapping information.

In one embodiment, the client 102 transmits the collected information to the server 106 (block 420). The transmission can occur using one of the methods and protocols described above in connection with FIGS. 2-3.

In one embodiment, the client 102 receives commands from the server 106 (block 430). In one embodiment the component 210 receives requests from a server side agent to access a file. In another embodiment, a client agent 120 receives requests from a server side agent to access a file. In still another embodiment, a redirector module receives requests from a server side agent 106 to access a file. In some embodiments, requests, such as a read request or a write request, are remapped from client 102 to server 106 or vice versa. In other embodiments, the client 102 responds to the requests and provides access to the file. In one of these embodiments, the client 102 transmits, to the server 106, file system data stored on the client 102. In another of these embodiments the server 106 integrates a display of the received file system data into a display of output data generated by at least one resource executing on the server 106. In still another of these embodiments, the client 102 responds to the intercepted request by displaying to a user of the client 102 the requested file.

Figure 4B:
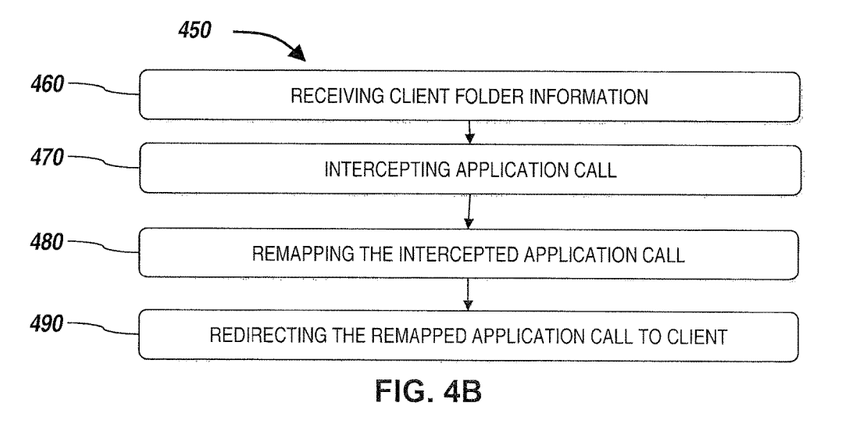
FIG. 4B is a flow diagram depicting an embodiment of a method for functions performed by a server.

Referring now to FIG. 4B, a flow diagram depicts one embodiment of a method 450 performed by a server 106. The method 450 includes receiving client folder information (block 460), intercepting an application call (block 470), remapping the intercepted application call (block 480), and redirecting the remapped application call to the client 102 (block 490).

In one embodiment, the server 106 receives client-side folder information (block 460). In another embodiment, a server agent receives client-side folder information.

In one embodiment, an interceptor component or hooking component intercepts a request from a resource (block 470). The interceptor can be, in one embodiment, a file system filter driver modified to provide the functionality described herein. A resource may include an application program module or any such suitable resource. Requests by a resource may include application calls. Application calls may include, but are not limited to, reads, writes, opens, and closes.

In one embodiment, the server agent remaps the intercepted application call (block 480). The remapping can, in one embodiment, include remapping from a pathname on a server to a pathname on a client. In another embodiment, the remapping can include remapping from a pathname on a client to a pathname on a server. In other embodiments, various combinations of client and server remapping occur.

In one embodiment, the server 106 redirects the remapped application calls to the client 102 (block 490). The redirection can occur using any of the methods discussed above in connection with FIGS. 2-4A.

Figure 5:
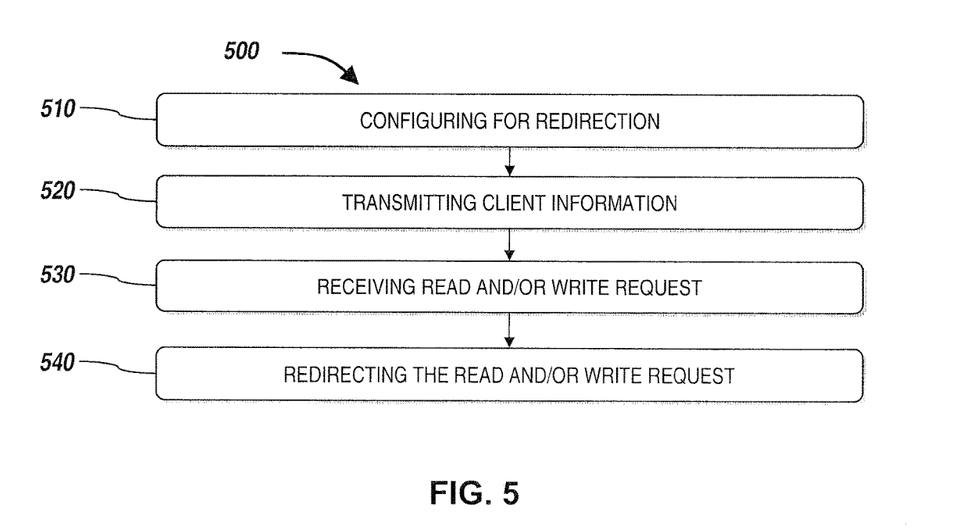
FIG. 5 is a flow diagram depicting an embodiment of a method for folder redirection.

Referring now to FIG. 5, a block diagram depicts one embodiment of a method 500 for redirecting a request for access to a folder on a first machine, the request being made by a resource executing within a remote access session on the first machine. The method includes configuring a remote access session for file system redirection (block 510), transmitting to the server 106 client file system information (block 520), receiving a read and/or write request during a remote access session (block 530), and redirecting the read and/or write request (block 540).

Referring now to FIG. 5, and in greater detail, a remote access session is configured for file system redirection (block 510). In one embodiment, an administrator configures the server 106 to allow or disallow redirection. In another embodiment, the administrator configures the policy engine executing on the server 106 to configure the redirection. In some embodiments, the configuration can include asking a user of the client 102 whether redirection is desired for a session. In other embodiments, redirection is automatically allowed for certain clients 102 and not allowed for other clients 102. In some other embodiments, redirection can be allowed for part of a session and not allowed for other portions of a session. In one of these embodiments, redirection is dynamically changeable during a session. In further embodiments, redirection occurs from either the server 106 to the client 102, from the client 102 to the server 106, or both.

The client agent 120 gathers and transmits client side file system information to the remote machine 106 (block 520). In one embodiment, the client agent 120 collects at least a portion of folder mapping information using a client context and transmits that information to the server 106 using the remote access protocol. The transmitted information, in one embodiment, includes the location of a special folder (e.g., c:\users\user1\Desktop for the "Desktop" folder).

In one embodiment, a client 102 connects to a server 106 that is executing an application on behalf of the client 102. In another embodiment, the application receives a request from the user of the client 102 in the form of file access requests such as File Open/Save and, in some embodiments, displays a dialogue box to the end-user (block 530). In still another embodiment, the application makes a request or system call similar to a FileOpen or FileCreate. In yet another embodiment, the request may include an identification of the location of the special folder path (e.g., FileOpen ("c:\users\user1\Desktop")). In some embodiments, an interceptor component (e.g., a hooking component), either on the client 102 or the server 106, intercepts such a system call and determines whether the request is targeted to access a special folder location on server.

In one embodiment, a File Open/Create call might be targeted to any file system where interception can be done in user mode, kernel mode, or using a file system filter driver. In another embodiment, a File Open/Create call might be targeted to a higher level application. In still another embodiment, redirection can be performed per-user, per-terminal server-session, per-application and even when saving files per-file-type. For example, TXT files may be redirected to the client's "My Documents" folder while presentation files, for example files generated using a presentation program such as MICROSOFT POWERPOINT, are not. In some embodiments, application programming interface (API) calls are intercepted and redirected. In other embodiments, calls are made to the shell namespace. In one of these embodiments, an interaction with the shell namespace involves different components of an operating system, and may operate at a different layer, than the components involved in a call to the file system.

In one embodiment, if redirection is enabled, the server redirects a request, such as a read request or a write request, to a destination (block 540). In one embodiment, a request to access a file on a client file system is mapped to a location on a server. In another embodiment, a request for access to a file on a server file system is mapped to a pathname identifying a related file on a client file system location. In another embodiment, once the call is validated to a server side special folder, the server agent, in some embodiments, remaps the folder name to a different folder location. The server agent maps the client file system that can be accessed as a regular drive/folder path by the server application. For example, in an embodiment in which the client file system stores a client special folder within a directory on a drive that is mapped as the "X" drive to a server, a server-side component receives client-side folder mapping information and translates the client-side special folder pathname to x:\users\user1\desktop from c:\users\user1\desktop, which was the client-side desktop folder pathname.

In one embodiment, when a server application attempts to access a special folder (e.g., a server desktop folder, c:\users\user1\desktop) on the server, the hooking component intercepts the system calls and remaps the identified pathname using the folder mapping information received from the client. In response, the server agent receives and transfers these remapped calls to the client agent. Then, the client side agent completes the request. This process is transparent to the application and to the user. Therefore, in some embodiments, the user runs the application remotely and automatically accesses his or her own local special folder from the application without taking any additional actions or manually requesting access to the local special folder.

In another embodiment, using the methods and systems described herein, a user may access a client machine, wherein a first server provides access to a resource and a second server provides access to a special folder. In such an embodiment, requests made by the resource on the first server for folder access on the client machine may be redirected to the second server, which may store a profile (e.g., a roaming profile) for the user.

In one embodiment, and by way of illustration, a first component on the server receives folder mapping information associated with a "My Documents" folder on a user's laptop. In another embodiment, the first component intercepts the request from a word processing application to save a document to a default location—in this example, to a "My Documents" folder on the server. The first component redirects the request to the "My Documents" folder on the laptop, as indicated by the received folder mapping information. In still another embodiment, the user may then utilize the locally-saved document even when disconnected from the server.

Having described certain embodiments of methods and systems for redirecting, to a second machine, without user intervention, a request for access to a folder on a first machine, the request being made by a resource executing within a remote access session on the first machine, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of redirecting, to a second machine, without user intervention, a request for access to a folder on a first machine, the request made by a resource executing within a remote access session on the first machine, the method comprising:
   receiving, by a component executing on the first machine and from the second machine within the remote access session, folder mapping information associated with a virtual folder provided by a third-party shell namespace on the second machine, the provided virtual folder corresponding to a user of the second machine, the third-party shell namespace comprising objects identified by a unique pathname;
   intercepting, by the component executing on the first machine, the request by the resource executing on behalf of the user of the second machine within the remote access session on the first machine, for access to the folder in the file system of the first machine;
   determining, by the component executing on the first machine, that redirection is configured for the remote access session; and
   redirecting, by the component executing on the first machine, the request for access to the folder in the file system of the first machine from the first machine to the second machine within the remote access session and responsive to the received folder mapping information corresponding to the user of the second machine;
   wherein the virtual folder is not part of a file system data associated with the second machine, and organizes files independent of a physical location corresponding to the virtual folder, and comprises links to files in any location on a plurality of networked machines.

2. The method of claim 1, further comprising providing, to the resource, access to at least one of: the file system data associated with the second machine, a special folder located on the second machine.

3. The method of claim 1, further comprising:
   identifying, in the intercepted request, an address associated with a folder located on the first machine;
   remapping the identified address to an address of the virtual folder provided by the third-party shell namespace on the second machine; and
   transmitting, to the second machine, the intercepted request and the remapped address.

4. The method of claim 1, wherein receiving further comprises receiving, by the component on the first machine, an address of the virtual folder provided by the third-party shell namespace on the second machine.

5. The method of claim 1, wherein receiving further comprises receiving, by the component on the first machine, an instruction to redirect, to the second machine, a request for access to file system data on the first machine, responsive to the received folder mapping information associated with the virtual folder provided by the third-party shell namespace on the second machine.

6. The method of claim 1, wherein intercepting further comprises intercepting, by the component, a request by the resource executing on the first machine to modify file system information associated with the first machine.

7. The method of claim 1, wherein intercepting further comprises intercepting, by the component, a request by a resource executing on the first machine to open a file in a folder provided by a shell namespace on the first machine.

8. The method of claim 1, wherein intercepting further comprises intercepting, by the component, a request by a resource executing on the first machine to modify a file in a folder provided by a shell namespace on the first machine.

9. The method of claim 1, comprising determining, by the component, redirection is configured for a first part of the remote access session.

10. The method of claim 1, comprising determining, by the component, redirection is disabled for a second part of the remote access session.

11. The method of claim 1, wherein redirecting further comprises transmitting, by the component, to a file system redirector, the intercepted request.

12. The method of claim 11, further comprising transmitting, by the file system redirector, the intercepted request to the second machine.

13. The method of claim 1, further comprising determining, by the component, that the request by the resource executing on the first machine is a request for access to a folder provided by a shell namespace on the first machine.

14. The method of claim 1, further comprising mapping, to the first machine, a folder on the second machine for access by a resource executing on the second machine.

15. The method of claim 1, further comprising:
   identifying, by an agent on the second machine, folder mapping information associated with the virtual folder provided by the third-party shell namespace on the second machine; and transmitting, by the agent, the identified folder mapping information to the first machine.

16. The method of claim 15, further comprising receiving, by the agent, from the first machine, a request for modification of the folder associated with the folder mapping information.

17. A system for redirecting, to a second machine, without user intervention, a request for access to a folder on a first machine, the request made by a resource executing within a remote access session on the first machine, the system comprising:
    a first machine;
    a second machine;
    a resource executing on behalf of the second machine within a remote access session on the first machine;
    a first component executing on the first machine, the first component configured to:
        receive, from the second machine within the remote access session, folder mapping information associated with a virtual folder provided by a third-party shell namespace on the second machine, the folder mapping information identifying the folder as residing in a file system of the second machine, the provided folder corresponding to a user of the second machine, the third-party shell namespace comprises objects identified by a unique pathname;
        intercept the request by the resource executing on behalf of the user of the second machine within the remote access session on the first machine to access the folder in the file system of the first machine; and
        redirect the request for access to the folder in the file system of the first machine from the first machine to the second machine within the remote access session, responsive to the received folder mapping information corresponding to the user of the second machine wherein the virtual folder not part of a file system data associated with the second machine, organizes files independent of a physical location corresponding to the virtual folder, and comprises links to files in any location on a plurality of networked machines; and
    a second component executing on the second machine, the second component configured to:
        receive the redirected request; and
        modify file system information on the second machine responsive to the received request.

18. The system of claim 17, wherein the first component further comprises a file system redirector receiving the intercepted request and transmitting the intercepted request to the second component.

19. The system of claim 17, wherein the first component further comprises a receiver receiving folder mapping information associated with a special folder provided by the third-party shell namespace on the second machine.

20. The system of claim 17, wherein the first component further comprises a receiver receiving folder mapping information associated with the virtual folder provided by the third-party shell namespace on the second machine.

* * * * *